United States Patent
Zhang et al.

(10) Patent No.: US 11,916,812 B2
(45) Date of Patent: Feb. 27, 2024

(54) OFDM CONTROL CHANNEL WITH SINGLE CARRIER WAVEFORM DATA CHANNEL

(71) Applicant: QUALCOMM Incorporated, San Diego, CA (US)

(72) Inventors: Xiaoxia Zhang, San Diego, CA (US); Tao Luo, San Diego, CA (US); Juan Montojo, San Diego, CA (US); Jing Sun, San Diego, CA (US); Srinivas Yerramalli, San Diego, CA (US); Vinay Chande, San Diego, CA (US); Zhifei Fan, San Diego, CA (US); Olufunmilola Omolade Awoniyi-Oteri, San Diego, CA (US); Sungwoo Park, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/875,441

(22) Filed: May 15, 2020

(65) Prior Publication Data
US 2020/0374056 A1 Nov. 26, 2020

Related U.S. Application Data

(60) Provisional application No. 62/850,438, filed on May 20, 2019.

(51) Int. Cl.
*H04L 5/00* (2006.01)
*H04W 72/20* (2023.01)
*H04W 72/54* (2023.01)

(52) U.S. Cl.
CPC .......... *H04L 5/0007* (2013.01); *H04W 72/20* (2023.01); *H04W 72/54* (2023.01)

(58) Field of Classification Search
CPC .. H04L 5/0007; H04W 72/0406; H04W 72/08
See application file for complete search history.

(56) References Cited

U.S. PATENT DOCUMENTS

| | | | |
|---|---|---|---|
| 10,917,278 B2* | 2/2021 | Thomas | H04L 27/26025 |
| 11,218,285 B2* | 1/2022 | Ji | H04L 5/023 |
| 2015/0181575 A1* | 6/2015 | Ng | H04W 72/042 |
| | | | 370/329 |

(Continued)

FOREIGN PATENT DOCUMENTS

| | | |
|---|---|---|
| CN | 108737311 A | 11/2018 |
| EP | 2355606 A1 | 8/2011 |

(Continued)

OTHER PUBLICATIONS

International Search Report and Written Opinion—PCT/US2020/033433—ISAEPO—dated Aug. 14, 2020.

*Primary Examiner* — Rhonda L Murphy
(74) *Attorney, Agent, or Firm* — Harrity & Harrity, LLP

(57) ABSTRACT

Various aspects of the present disclosure generally relate to wireless communication. In some aspects, a user equipment (UE) may receive a control channel that uses an orthogonal frequency division multiplexing (OFDM) waveform. The UE may transmit or receiving a data channel, associated with the control channel, that uses a single-carrier (SC) waveform. Numerous other aspects are provided.

30 Claims, 7 Drawing Sheets

(56) References Cited

U.S. PATENT DOCUMENTS

| | | | |
|---|---|---|---|
| 2018/0279292 A1 | 9/2018 | Luo et al. | |
| 2019/0132109 A1 | 5/2019 | Zhou et al. | |
| 2020/0077432 A1* | 3/2020 | Xiong | H04L 5/0092 |
| 2021/0058964 A1* | 2/2021 | Hooli | H04W 74/008 |
| 2021/0126763 A1* | 4/2021 | Zhou | H04L 5/001 |
| 2021/0258876 A1* | 8/2021 | Papasakellariou | H04L 5/0096 |
| 2022/0287067 A1* | 9/2022 | Lee | H04W 72/1242 |

FOREIGN PATENT DOCUMENTS

| | | |
|---|---|---|
| KR | 20190038279 A | 4/2019 |
| WO | 2017222277 A1 | 12/2017 |
| WO | 2018064306 A1 | 4/2018 |

* cited by examiner

OFDM CONTROL CHANNEL WITH SINGLE CARRIER WAVEFORM DATA CHANNEL

CROSS-REFERENCE TO RELATED APPLICATION

This Patent Application claims priority to U.S. Patent Application No. 62/850,438, filed on May 20, 2019, entitled "OFDM CONTROL CHANNEL WITH SINGLE CARRIER WAVEFORM DATA CHANNEL," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for an orthogonal frequency division multiplexing (OFDM) waveform control channel with a single carrier (SC) waveform data channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a control channel that uses an orthogonal frequency division multiplexing (OFDM) waveform; and transmitting or receiving a data channel, associated with the control channel, that uses a single-carrier (SC) waveform.

In some aspects, a UE for wireless communication may include memory and one or more processors operatively coupled to the memory. The memory and the one or more processors may be configured to receive a control channel that uses an OFDM waveform; and transmit or receive a data channel, associated with the control channel, that uses an SC waveform.

In some aspects, a non-transitory computer-readable medium may store one or more instructions for wireless communication. The one or more instructions, when executed by one or more processors of a UE, may cause the one or more processors to receive a control channel that uses an OFDM waveform; and transmit or receive a data channel, associated with the control channel, that uses an SC waveform.

In some aspects, an apparatus for wireless communication may include means for receiving a control channel that uses an OFDM waveform; and means for transmitting or receiving a data channel, associated with the control channel, that uses an SC waveform.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
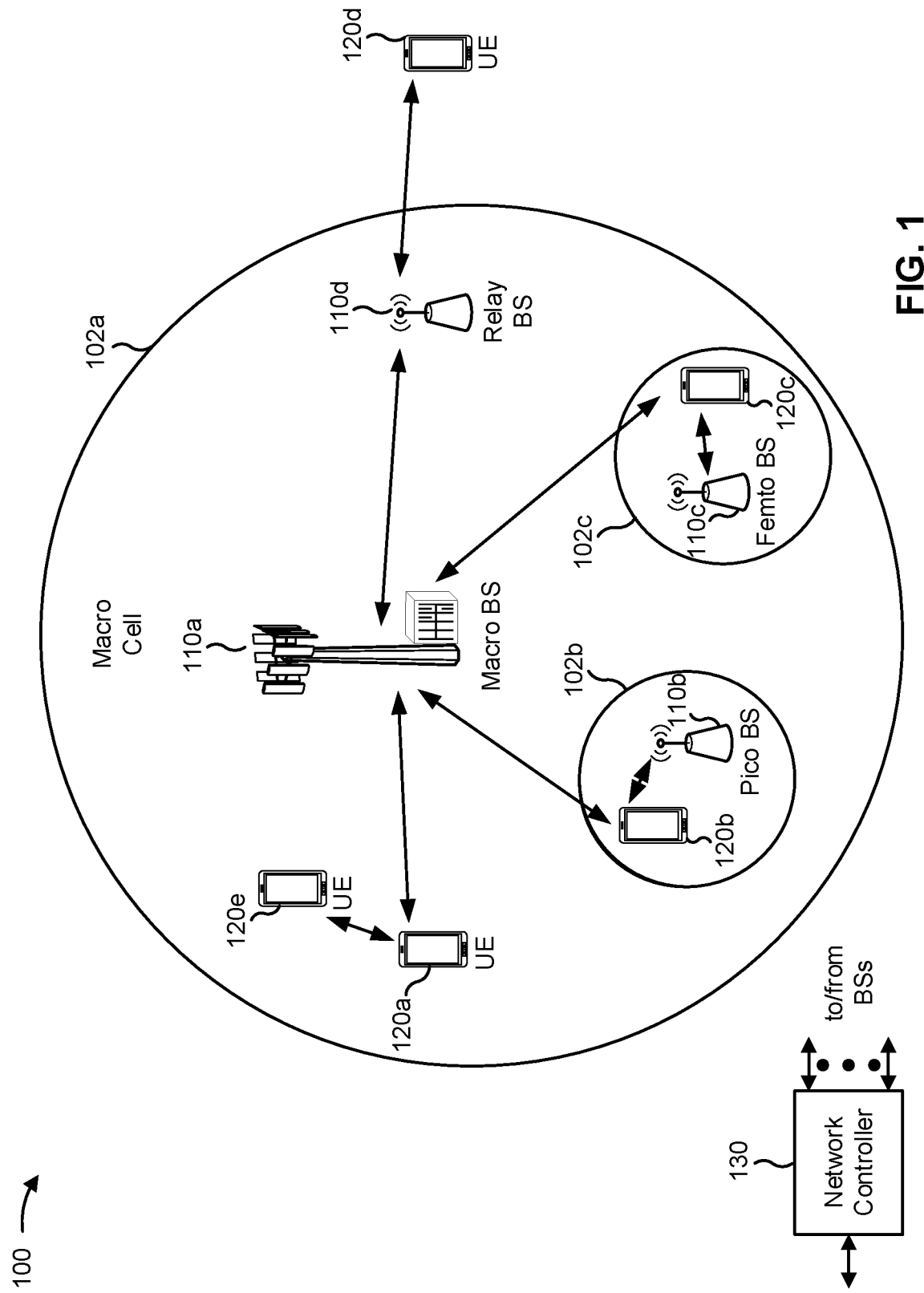
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
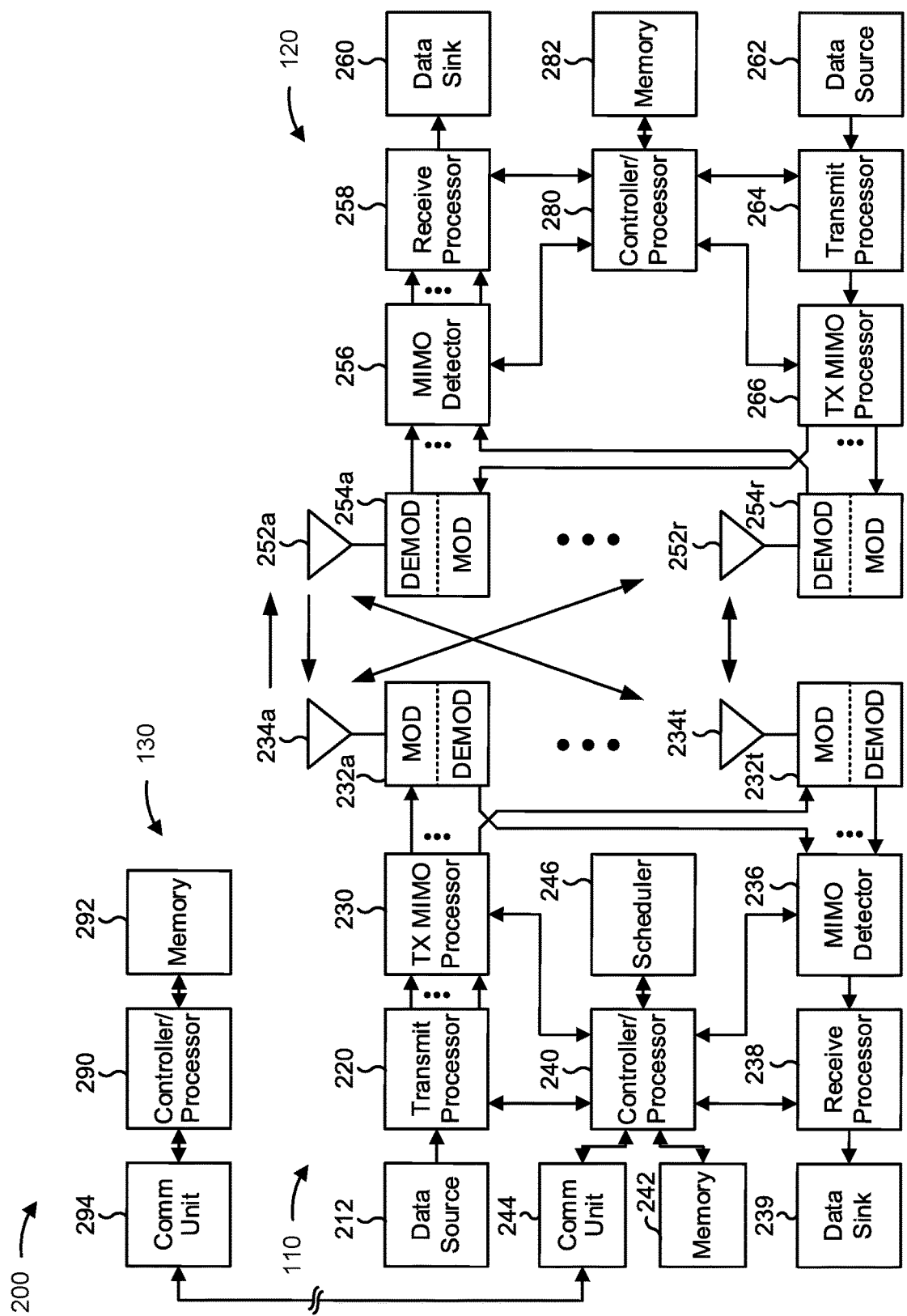
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with an OFDM waveform control channel with an SC waveform data channel, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a control channel that uses an OFDM waveform, means for transmitting or receiving a data channel, associated with the control channel, that uses an SC waveform, and/or the like. In some aspects, such means may include one or more components of UE 120 described in connection with FIG. 2.

As indicated above, FIG. 2 is provided as an example. Other examples may differ from what is described with regard to FIG. 2.

NR may use a variety of frequency ranges. One frequency range that is considered for use in NR is the Frequency Range 4, which may have a range of approximately 52 GHz to approximately 114.25 GHz, and which may use licensed bands, unlicensed bands, or a combination of licensed bands and unlicensed bands.

In some aspects, a communication may use an OFDM waveform. An OFDM waveform may provide high spectral efficiency and may facilitate higher-order multiple-input multiple-output (MIMO) operations to achieve high data rates. One example of an OFDM waveform is the CP-OFDM waveform. In some aspects, a communication may use an SC waveform. SC waveforms may reduce peak-to-average power ratio (PAPR), thereby improving coverage. Furthermore, the SC waveform may also enable time-domain implementation without mandating a fast-Fourier-transform (FFT) or inverse FFT (IFFT) operation. It may be difficult to implement the SC waveform for a control channel, due to design challenges and incompatibility with existing approaches. However, the SC waveform may provide improved PAPR and simplify time-domain implementation for data channels.

Some techniques and apparatuses described herein use an OFDM waveform for a control channel (e.g., a physical downlink control channel (PDCCH)) and an SC waveform or an OFDM waveform for a data channel (e.g., a physical uplink shared channel (PUSCH), a physical downlink shared channel (PDSCH), and/or the like). When an SC waveform is used for the data channel, techniques and apparatuses described herein provide bandwidth part (BWP) configurations for the control channel (using the OFDM waveform) and the data channel (using the SC waveform). For example, some techniques and apparatuses described herein use a same BWP configuration for the control channel and the data channel, whereas some techniques and apparatuses described herein use different BWP configurations for the control channel and the data channel. Still further, some techniques and apparatuses described herein provide a two-step control channel procedure, whereby resource allocation information is signaled in a first control channel (using an OFDM waveform) and other information for a data channel is signaled in a second control channel, a reference signal, or the data channel itself (e.g., using an SC waveform). Thus, compatibility between OFDM waveform control channels and SC waveform data channels is improved, coverage of the data channel is improved, and implementation is simplified relative to using an SC-based control channel.

Figure 3:
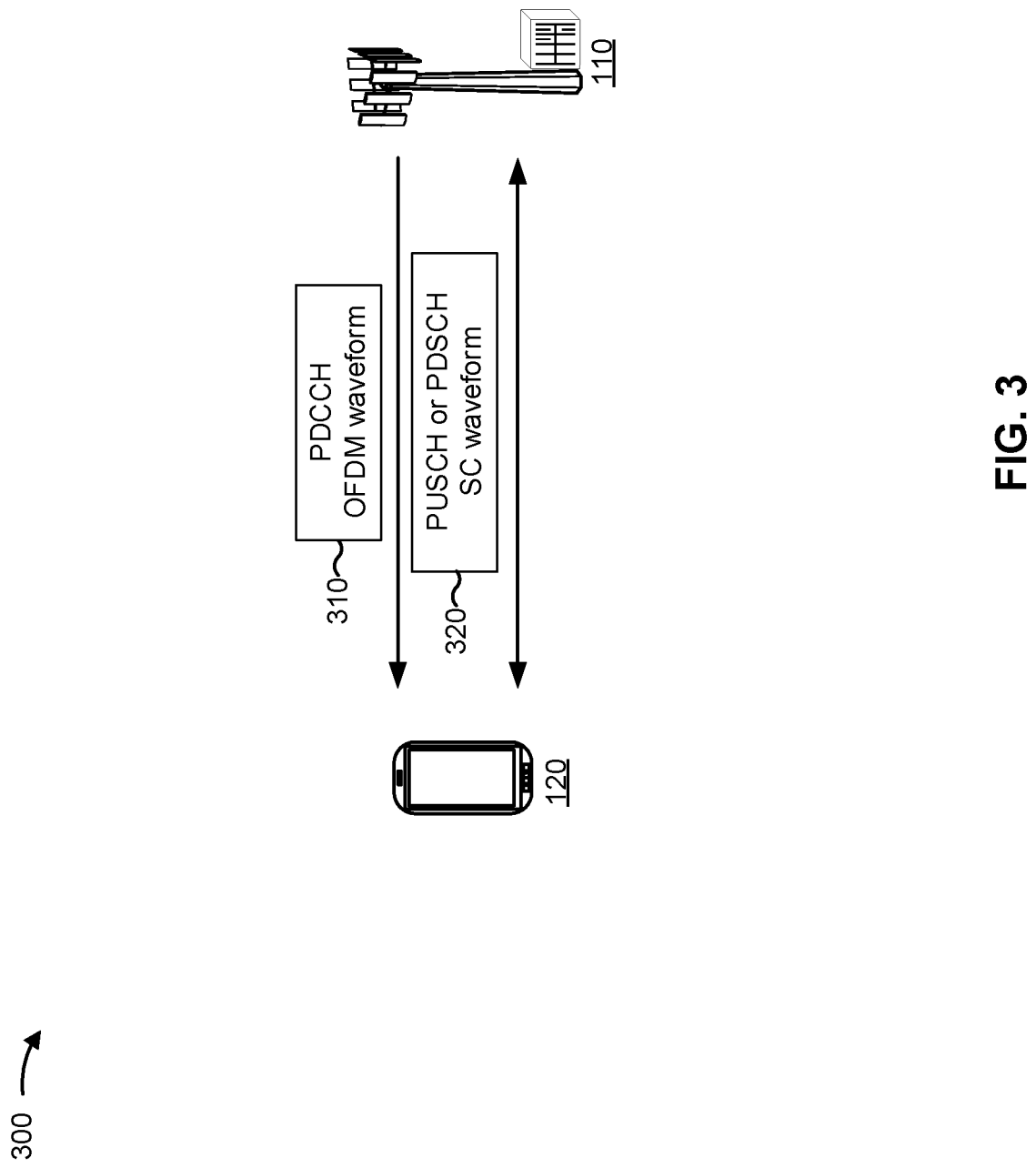
FIG. 3 is a diagram illustrating an example of a control channel using an OFDM waveform and a corresponding data channel using an SC waveform, in accordance with various aspects of the present disclosure.

FIG. 3 is a diagram illustrating an example 300 of a control channel using an OFDM waveform and a corresponding data channel using an SC waveform, in accordance with various aspects of the present disclosure. As shown, example 300 includes a BS 110 and a UE 120. The UE 120 may include, for example, a UE 120 capable of communicating in Frequency Range 4, a standalone (SA)-capable UE 120, and/or the like.

As shown by reference number 310, the BS 110 may transmit a control channel (e.g., a PDCCH) to the UE 120 using an OFDM waveform. In some aspects, the control channel may identify a resource allocation for a data channel (shown by reference number 320). For example, the control channel may include a one-time resource allocation for the data channel, a semi-persistent scheduling (SPS) configuration for the data channel, a configured grant (CG) for the data channel, and/or the like. In some aspects, the UE 120 may receive the control channel in a high band (e.g., a Frequency Range 4 band, a band between approximately 52 GHz and 115 GHz, and/or the like).

In some aspects, the UE 120 may perform initial access to access a network provided by the BS 110 (not shown). For example, the UE 120 may receive a synchronization signal block on an initial bandwidth part (BWP). The initial BWP may use an OFDM waveform, and may use a small FFT operation to manage UE complexity. The synchronization signal block may include configuration information that indicates that the UE 120 is to move to a wideband BWP. In some aspects, the configuration information may indicate whether the UE 120 is to use a CP-OFDM waveform for the wideband BWP or an SC waveform for the wideband BWP. For example, the BS 110 may configure the UE to use the CP-OFDM waveform or the SC waveform based at least in part on a UE capability report that indicates whether the UE 120 is capable of using the CP-OFDM waveform or the SC waveform. Generally, the CP-OFDM waveform may provide higher spectral efficiency and may support higher-order MIMO operations relative to the SC waveform, whereas the SC waveform may provide reduced PAPR and lower-complexity reception/transmission relative to the CP-OFDM waveform.

As shown by reference number 320, the UE 120 may receive or transmit a data channel, such as a PUSCH or a PDSCH. In this case, the UE 120 receives or transmits the data channel using an SC waveform (e.g., based at least in part on the control channel indicating that the UE 120 is to use the SC waveform, based at least in part on the UE 120 supporting the SC waveform, based at least in part on the UE 120 being configured to use the SC waveform, and/or the like). Particular examples of BWP configurations for the UE 120 and the BS 110 when using the SC waveform are provided below in connection with FIGS. 4, 5, and 6. In some aspects, the UE 120 may be configured to use the OFDM waveform for the data channel, which is not described any further herein.

As indicated above, FIG. 3 is provided as an example. Other examples may differ from what is described with respect to FIG. 3.

Figure 4:
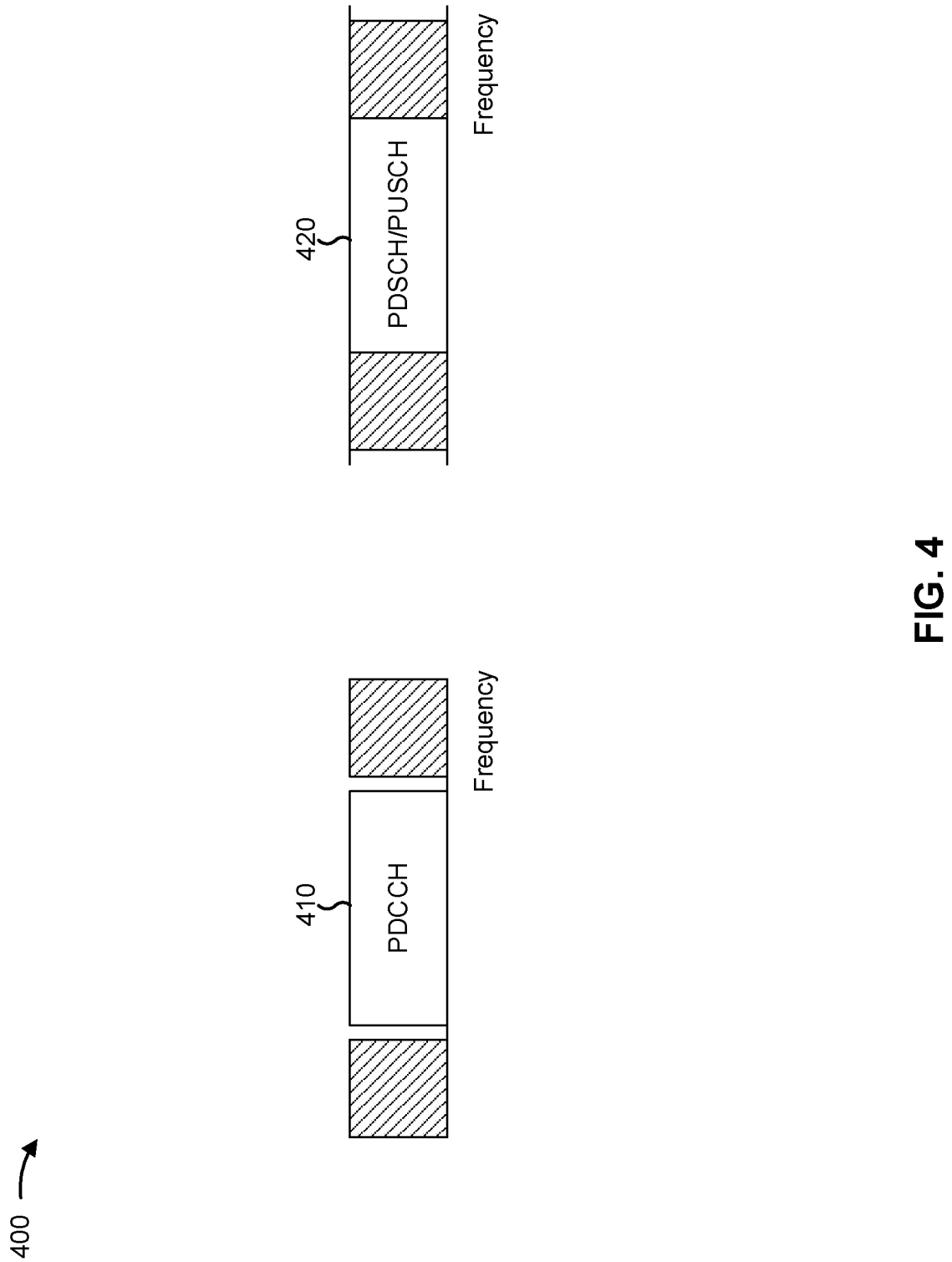
FIG. 4 is a diagram illustrating an example of a bandwidth part configuration for an OFDM waveform control channel and an SC waveform data channel, in accordance with various aspects of the present disclosure.

FIG. 4 is a diagram illustrating an example 400 of ds for an OFDM waveform control channel and an SC waveform data channel, in accordance with various aspects of the present disclosure. In FIG. 4, the horizontal axis represents frequency and the vertical axis represents time.

The control channel (e.g., the control channel shown by reference number 310 in FIG. 3) is shown by reference number 410. The control channel may be transmitted using an OFDM waveform and spans the entire or subset of the current BWP. In some aspects, the control channel may be transmitted as downlink control information on the data channel, or as a standalone control channel. The data channel (e.g., the data channel shown by reference number 320 in FIG. 3) is shown by reference number 420. The data channel may be transmitted using an SC waveform with DFT-s-OFDM implementation (i.e., DFT and IFFT based implementation) as specified in LTE or NR uplink, so no additional guard sub-carriers or guard bands may be used between the data channel and other communications (shown by the rectangles with diagonal hatching). The data channel may use the SC waveform to achieve better PAPR than an OFDM waveform.

In some aspects, the control channel and the data channel may be associated with a same BWP configuration. For example, the control channel may occupy resource elements associated with a control resource set (CORESET) of an active BWP associated with the BWP configuration. Furthermore, the control channel may be transmitted on the same active BWP as the data channel. When the control channel and the data channel are transmitted on the same active BWP, no switching gap may be required between the control channel and the data channel. Furthermore, the same filtering configuration can be used for the control channel and the data channel, thereby simplifying implementation and conserving UE resources that would otherwise be used to switch filtering configurations.

As indicated above, FIG. 4 is provided as an example. Other examples may differ from what is described with respect to FIG. 4.

Figure 5:
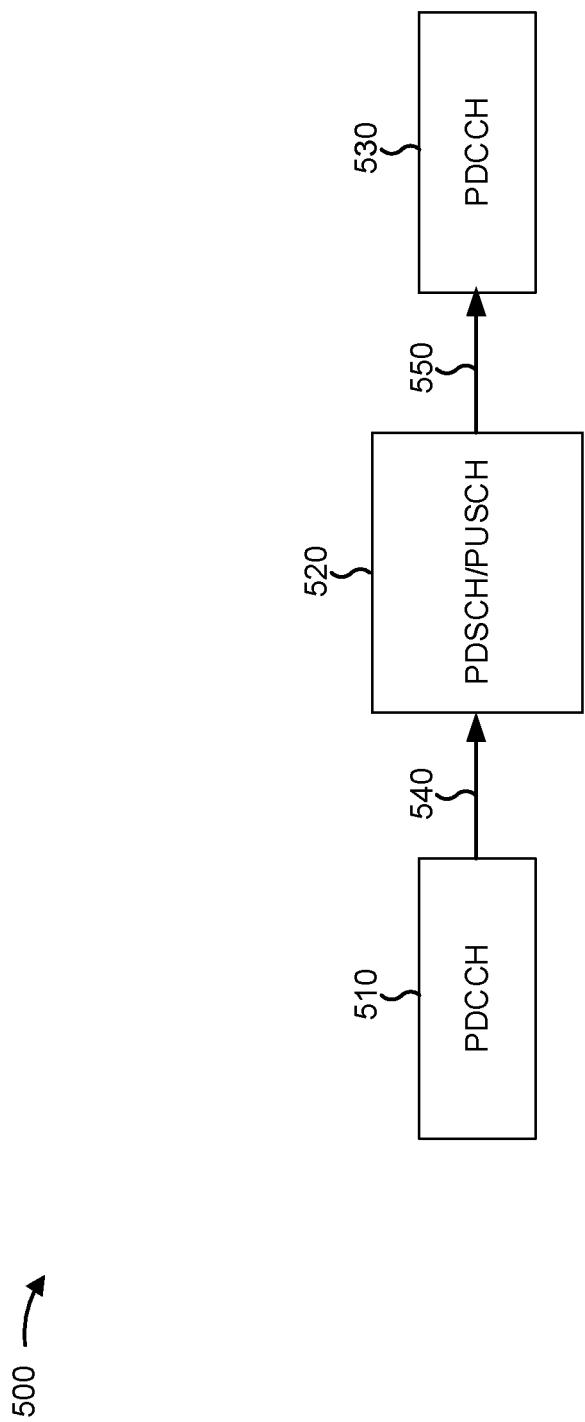
FIG. 5 is a diagram illustrating another example of a bandwidth part configuration for an OFDM waveform control channel and an SC waveform data channel, in accordance with various aspects of the present disclosure.

FIG. 5 is a diagram illustrating another example 500 of a bandwidth part configuration for an OFDM waveform control channel and an SC waveform data channel, in accordance with various aspects of the present disclosure. In some aspects, the control channel may be associated with a smaller BWP configuration (e.g., associated with a narrower active BWP) than the data channel. This may reduce implementation complexity for the OFDM waveform control channel, while increasing a data rate of the data channel. In this case, different filtering may be used for the control channel and the data channel. In such a case, cross-slot scheduling may be used for the data channel and/or a non-zero gap may be provided between the control channel and the data channel. Furthermore, in such a case, a multi-transmission-time-interval (TTI) grant, an SPS grant, or a CG may be used to reduce the switching overhead of the UE 120.

The control channel is shown by reference number 510, and the data channel is shown by reference number 520. The horizontal direction represents time, whereas the vertical direction represents frequency. A subsequent control channel is shown by reference number 530. Switching operations between a BWP associated with the control channel and a BWP associated with the data channel are shown by reference numbers 540 and 550. In this case, the switching times may be non-zero, as described above.

As indicated above, FIG. 5 is provided as an example. Other examples may differ from what is described with respect to FIG. 5.

Figure 6:
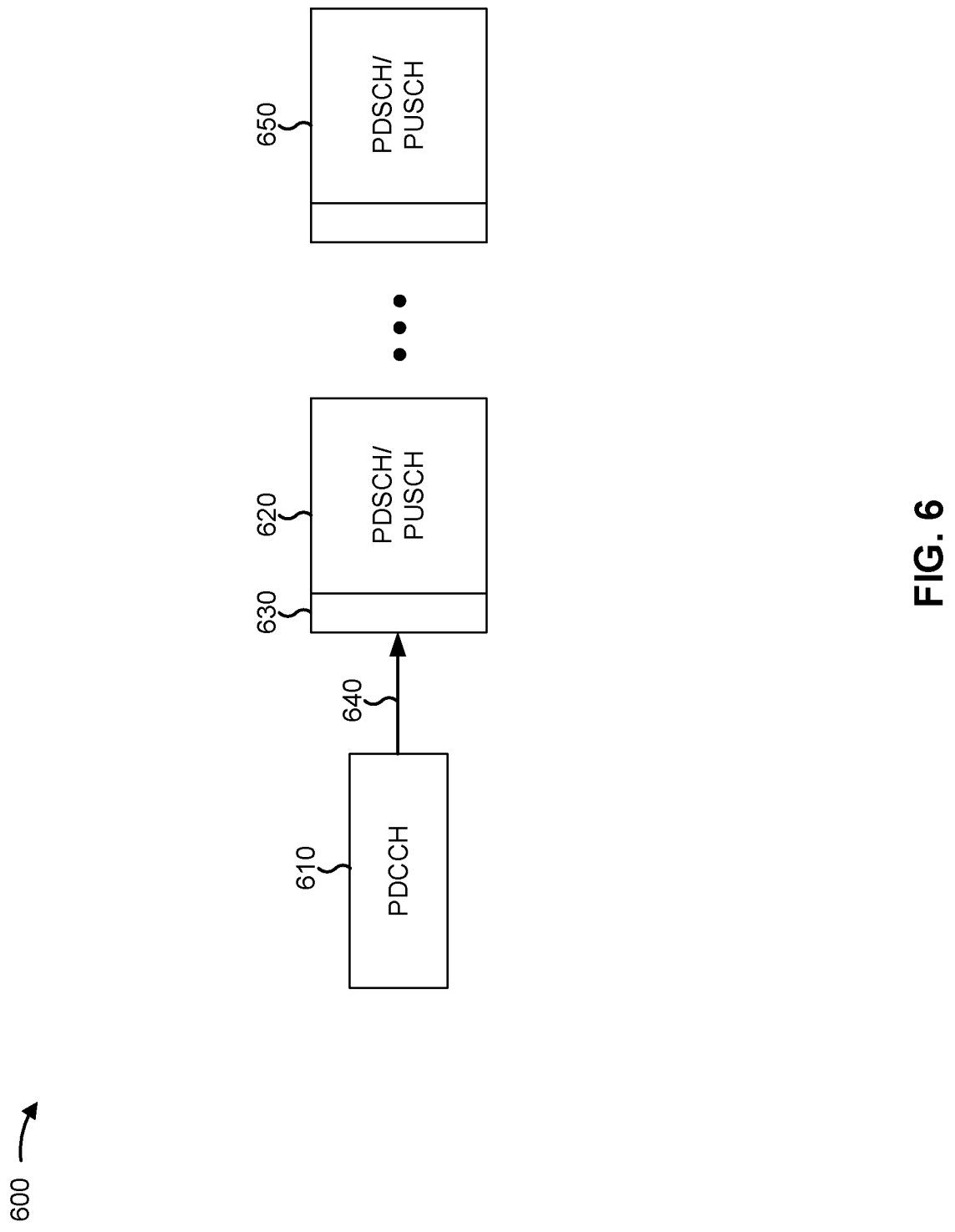
FIG. 6 is a diagram illustrating another example of a bandwidth part configuration for an OFDM waveform control channel and an SC waveform data channel, in accordance with various aspects of the present disclosure.

FIG. 6 is a diagram illustrating yet another example 600 of a bandwidth part configuration for an OFDM waveform control channel and an SC waveform data channel, in accordance with various aspects of the present disclosure. FIG. 6 illustrates an example wherein a control channel, shown by reference number 610, provides resource allocation and other scheduling information for a data channel, shown by reference number 620. Furthermore, the data channel is associated with an indicator, shown by reference number 630. In some aspects, the control channel may be transmitted using a smaller BWP configuration (e.g., corresponding to a narrow active BWP) and the indicator and/or the data channel may be transmitted using a larger BWP configuration (e.g., corresponding to a wide active BWP). In some aspects, the control channel may be monitored using a reduced number of monitoring occasions (e.g., the control channel may be monitored less frequently than in a baseline monitoring configuration), which may reduce switching time (shown by reference number 640) between the BWP associated with the control channel and the BWP associated with the data channel. Reference number 650 shows a subsequent data channel. As shown, the UE 120 may not switch back to the control channel's BWP between the data channel 620 and the data channel 650, thereby reducing delay and conserving resources of the UE 120. For example, the UE 120 may use a configuration indicated by an indicator associated with the data channel 650 to receive or transmit the data channel 650.

In some aspects, the indicator (shown by reference number 620) may include information for receiving the data channel. For example, the indicator may indicate a modulation and coding scheme (MCS) for the data channel, an on-off indicator for the data channel, and/or the like. In some aspects, the indicator may be transmitted as a reference signal (e.g., a demodulation reference signal (DMRS) and/or the like), downlink control information (DCI) on the data channel, and/or the like. In some aspects, the indicator may be transmitted using the SC waveform. In some aspects, the indicator may be based at least in part on the control channel. For example, resources used for the indicator, modulation order used for the indicator, a DCI format of the control channel, and/or the like, may be based at least in part on information provided in the control channel or a configuration of the control channel.

As indicated above, FIG. 6 is provided as an example. Other examples may differ from what is described with respect to FIG. 6.

Figure 7:
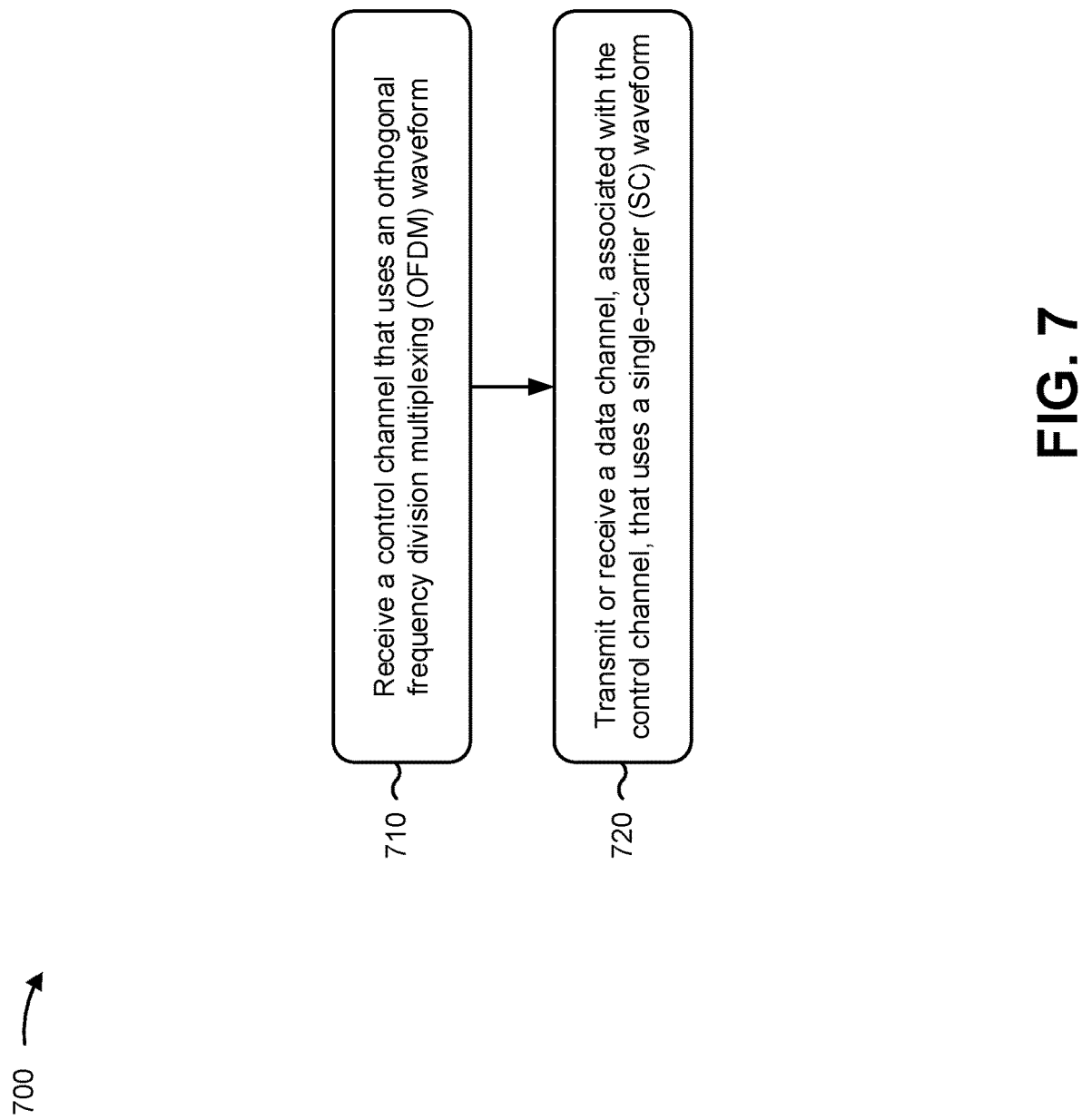
FIG. 7 is a diagram illustrating an example process performed, for example, by a user equipment, in accordance with various aspects of the present disclosure.

FIG. 7 is a diagram illustrating an example process 700 performed, for example, by a user equipment, in accordance with various aspects of the present disclosure. Example process 700 is an example where a UE (e.g., user equipment 120 and/or the like) performs operations associated with an OFDM control channel and an SC waveform data channel.

As shown in FIG. 7, in some aspects, process 700 may include receiving a control channel that uses an orthogonal frequency division multiplexing (OFDM) waveform (block 710). For example, the user equipment (e.g., using receive processor 258, transmit processor 264, controller/processor 280, memory 282, and/or the like) may receive a control channel that uses an OFDM waveform, as described above.

As further shown in FIG. 7, in some aspects, process 700 may include transmitting or receiving a data channel, associated with the control channel, that uses a single-carrier (SC) waveform (block 720). For example, the user equipment (e.g., using receive processor 258, transmit processor 264, controller/processor 280, memory 282, and/or the like) may transmit or receive a data channel, associated with the control channel, that uses an SC waveform, as described above.

Process 700 may include additional aspects, such as any single aspect or any combination of aspects described below and/or in connection with one or more other processes described elsewhere herein.

In a first aspect, the control channel and the data channel use a same BWP configuration.

In a second aspect, alone or in combination with the first aspect, the control channel and the data channel use a same bandwidth in accordance with the same BWP configuration.

In a third aspect, alone or in combination with one or more of the first and second aspects, the control channel and the data channel use a same active BWP in accordance with the same BWP configuration.

In a fourth aspect, alone or in combination with one or more of the first through third aspects, the data channel is associated with a rank of 1 or a low modulation order. For example, when SC waveform is used for data transmission or reception, quadrature phase shift keying (QPSK) may be used instead of 16 QAM or 64 QAM. In some aspects, a low modulation order may refer to QPSK or BPSK. In some aspects, a low modulation order may refer to a modulation order that is decreased relative to a configured or baseline modulation order of the data transmission or reception.

In a fifth aspect, alone or in combination with one or more of the first through fourth aspects, a same filtering configuration is used for the control channel and the data channel.

In a sixth aspect, alone or in combination with one or more of the first through fifth aspects, no switching gap is used between the control channel and the data channel other than a switching gap to switch to an active bandwidth part of the control channel and the data channel.

In a seventh aspect, alone or in combination with one or more of the first through sixth aspects, the control channel uses a first BWP configuration and the data channel use a second BWP configuration. In some aspects, the first BWP configuration is for a narrower BWP than the second BWP configuration.

In an eighth aspect, alone or in combination with one or more of the first through seventh aspects, a first filtering configuration is used for the control channel and a second filtering configuration is used for the data channel.

In a ninth aspect, alone or in combination with one or more of the first through eighth aspects, the data channel is scheduled by the control channel using cross-slot scheduling.

In a tenth aspect, alone or in combination with one or more of the first through ninth aspects, there is a non-zero gap between the control channel and the data channel.

In an eleventh aspect, alone or in combination with one or more of the first through tenth aspects, the control channel provides at least one of a multi-transmission-time-interval grant, a semi-persistent scheduling allocation, or a configured grant for the data channel.

In a twelfth aspect, alone or in combination with one or more of the first through eleventh aspects, the control channel is monitored using a reduced number of monitoring occasions.

In a thirteenth aspect, alone or in combination with one or more of the first through twelfth aspects, the data channel is associated with an indicator, received separately from the control channel, that indicates information for receiving the data channel.

In a fourteenth aspect, alone or in combination with one or more of the first through thirteenth aspects, the information for receiving the data channel includes at least one of an MCS for the data channel, or an on-off indicator for the data channel.

In a fifteenth aspect, alone or in combination with one or more of the first through fourteenth aspects, the indicator comprises a reference signal sequence.

In a sixteenth aspect, alone or in combination with one or more of the first through fifteenth aspects, the indicator uses the SC waveform.

In a seventeenth aspect, alone or in combination with one or more of the first through sixteenth aspects, the indicator is received as downlink control information on the data channel.

In an eighteenth aspect, alone or in combination with one or more of the first through seventeenth aspects, the control channel is received as downlink control information on the data channel.

In a nineteenth aspect, alone or in combination with one or more of the first through eighteenth aspects, the control channel and the data channel are in a New Radio high band above approximately 52.6 GHz.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, via a first bandwidth part (BWP) configuration, a control channel that uses an orthogonal frequency division multiplexing (OFDM) waveform;
   receiving, via a second BWP configuration, larger than the first BWP configuration, and based at least in part on receiving the control channel, an indicator indicating at least one of a modulation and coding scheme (MCS) for a data channel, or an on-off indicator for the data channel;
   receiving, via the second BWP configuration and based at least in part on the indicator, the data channel,
      wherein a first filtering configuration is used for the control channel, a second filtering configuration is used for the data channel, and a non-zero gap is present between the control channel and the data channel; and
   transmitting or receiving, via the second BWP configuration and based at least in part on receiving the data channel, another data channel,
      wherein the UE remains on the second BWP configuration during an entire time period between receiving the data channel and transmitting or receiving the other data channel, and
      wherein at least one of the indicator, the data channel, or the other data channel uses a single carrier (SC) waveform.

2. The method of claim 1, wherein the data channel is associated with a rank of 1 or a low modulation order.

3. The method of claim 1, further comprising:
   receiving, via the first BWP configuration, another control channel that uses the OFDM waveform,
      wherein the other data channel is transmitted or received based at least in part on the other control channel.

4. The method of claim 1, wherein the data channel is at least partially scheduled by the control channel using cross-slot scheduling.

5. The method of claim 1, wherein at least one of the control channel or the other control channel is monitored using a reduced number of monitoring occasions than in a baseline monitoring configuration.

6. The method of claim 1, wherein the indicator includes the MCS for the data channel and an on-off indicator for the data channel.

7. The method of claim 1, wherein the indicator comprises a demodulation reference signal sequence.

8. The method of claim 1, wherein at least two of the indicator, the data channel, or the other data channel uses a single carrier (SC) waveform.

9. The method of claim 1, wherein the indicator is received as downlink control information on the data channel.

10. The method of claim 1, wherein the control channel is received as downlink control information on the data channel.

11. The method of claim 1, wherein the control channel and the data channel are in a New Radio high band above approximately 52.6 GHz.

12. A user equipment (UE) for wireless communication, comprising:
   one or more memories; and
   one or more processors coupled to the one or more memories, the one or more processors configured to:
      receive, via a first bandwidth part (BWP) configuration, a control channel that uses an orthogonal frequency division multiplexing (OFDM) waveform;
      receive, via a second BWP configuration, larger than the first BWP configuration, and based at least in part on receiving the control channel, an indicator indicating at least one of a modulation and coding scheme (MCS) for a data channel, or an on-off indicator for the data channel;
      receive, via the second BWP configuration and based at least in part on the indicator, the data channel,
         wherein a first filtering configuration is used for the control channel, a second filtering configuration is used for the data channel, and a non-zero gap is present between the control channel and the data channel; and
      transmit or receive, via the second BWP configuration and based at least in part on receiving the data channel, another data channel,
         wherein the UE remains on the second BWP configuration during an entire time period between receiving the data channel and transmitting or receiving the other data channel, and
         wherein at least one of the indicator, the data channel, or the other data channel uses a single carrier (SC) waveform.

13. The UE of claim 12, wherein the one or more processors are further configured to:
   receive, via the first BWP configuration, another control channel that uses the OFDM waveform,
      wherein the other data channel is transmitted or received based at least in part on the other control channel.

14. The UE of claim 12, wherein the data channel is associated with a rank of for a low modulation order.

15. The UE of claim 12, wherein the data channel is at least partially scheduled by the control channel that uses cross-slot scheduling.

16. The UE of claim 12, wherein at least one of the control channel or the other control channel is monitored using a reduced number of monitoring occasions than in a baseline monitoring configuration.

17. The UE of claim 12, wherein at least two of the indicator, the data channel, or the other data channel uses a single carrier (SC) waveform.

18. The UE of claim 12, wherein the indicator comprises a demodulation reference signal sequence.

19. A non-transitory computer-readable medium storing one or more instructions for wireless communication, the one or more instructions comprising:
one or more instructions that, when executed by one or more processors of a user equipment (UE), cause the one or more processors to:
receive, via a first bandwidth part (BWP) configuration, a control channel that uses an orthogonal frequency division multiplexing (OFDM) waveform;
receive, via a second BWP configuration, larger than the first BWP configuration, and based at least in part on receiving the control channel, an indicator indicating at least one of a modulation and coding scheme (MCS) for a data channel, or an on-off indicator for the data channel;
receive, via the second BWP configuration and based at least in part on the indicator, the data channel,
wherein a first filtering configuration is used for the control channel, a second filtering configuration is used for the data channel, and a non-zero gap is present between the control channel and the data channel; and
transmit or receive, via the second BWP configuration and based at least in part on receiving the data channel, another data channel,
wherein the UE remains on the second BWP configuration during an entire time period between receiving the data channel and transmitting or receiving the other data channel, and
wherein at least one of the indicator, the data channel, or the other data channel uses a single carrier (SC) waveform.

20. The non-transitory computer-readable medium of claim 19, wherein the data channel is associated with a rank of for a low modulation order.

21. The non-transitory computer-readable medium of claim 19, wherein the data channel is at least partially scheduled by the control channel that uses cross-slot scheduling.

22. The non-transitory computer-readable medium of claim 19, wherein at least one of the control channel or the other control channel is monitored using a reduced number of monitoring occasions than in a baseline monitoring configuration.

23. The non-transitory computer-readable medium of claim 19, wherein the indicator includes the MCS for the data channel and the on-off indicator for the data channel.

24. The non-transitory computer-readable medium of claim 19, wherein at least two of the indicator, the data channel, or the other data channel uses a single carrier (SC) waveform.

25. An apparatus for wireless communication, comprising:
means for receiving, via a first bandwidth part (BWP) configuration, a control channel that uses an orthogonal frequency division multiplexing (OFDM) waveform;
means for receiving, via a second BWP configuration, larger than the first BWP configuration, and based at least in part on receiving the control channel, an indicator indicating at least one of a modulation and coding scheme (MCS) for a data channel, or an on-off indicator for the data channel;
means for receiving, via the second BWP configuration and based at least in part on the indicator, the data channel,
wherein a first filtering configuration is used for the control channel, a second filtering configuration is used for the data channel, and a non-zero gap is present between the control channel and the data channel; and
means for transmitting or receiving, via the second BWP configuration and based at least in part on receiving the data channel, another data channel,
wherein the apparatus remains on the second BWP configuration during an entire time period between receiving the data channel and transmitting or receiving the other data channel, and
wherein at least one of the indicator, the data channel, or the other data channel uses a single carrier (SC) waveform.

26. The apparatus of claim 25, wherein at least two of the indicator, the data channel, or the other data channel uses a single carrier (SC) waveform.

27. The apparatus of claim 25, wherein the data channel is associated with a rank of 1 or a low modulation order.

28. The apparatus of claim 25, wherein the data channel is at least partially scheduled by the control channel that uses cross-slot scheduling.

29. The apparatus of claim 25, wherein at least one of the control channel or the other control channel is monitored using a reduced number of monitoring occasions than in a baseline monitoring configuration.

30. The apparatus of claim 25, wherein the indicator includes the MCS for the data channel and the on-off indicator for the data channel.

* * * * *